W. R. JONES.
MOWER AND TEDDER.
APPLICATION FILED APR. 18, 1913.
1,137,630.
Patented Apr. 27, 1915.
2 SHEETS—SHEET 1.
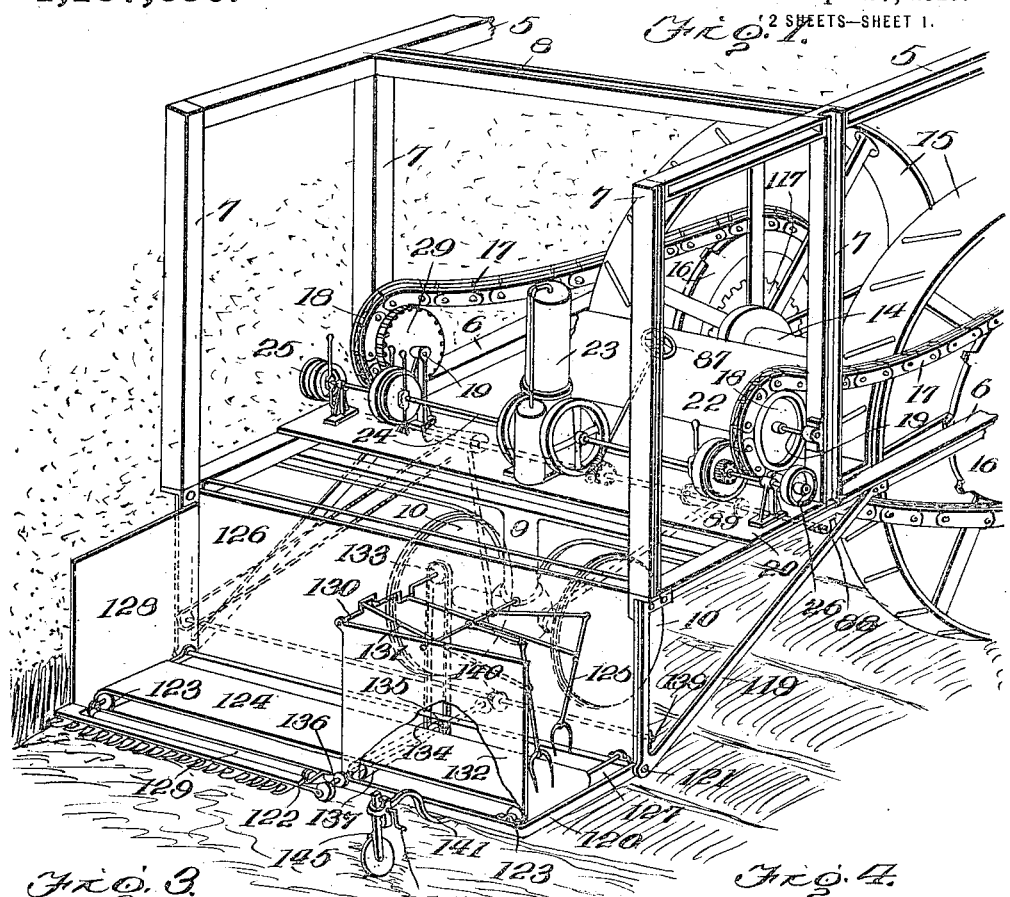
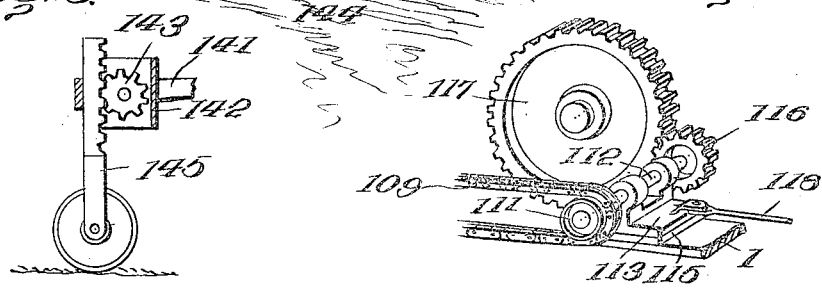
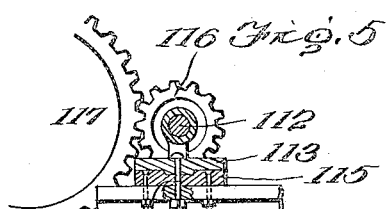
Witnesses
Inventor
W. R. Jones.
Attorneys

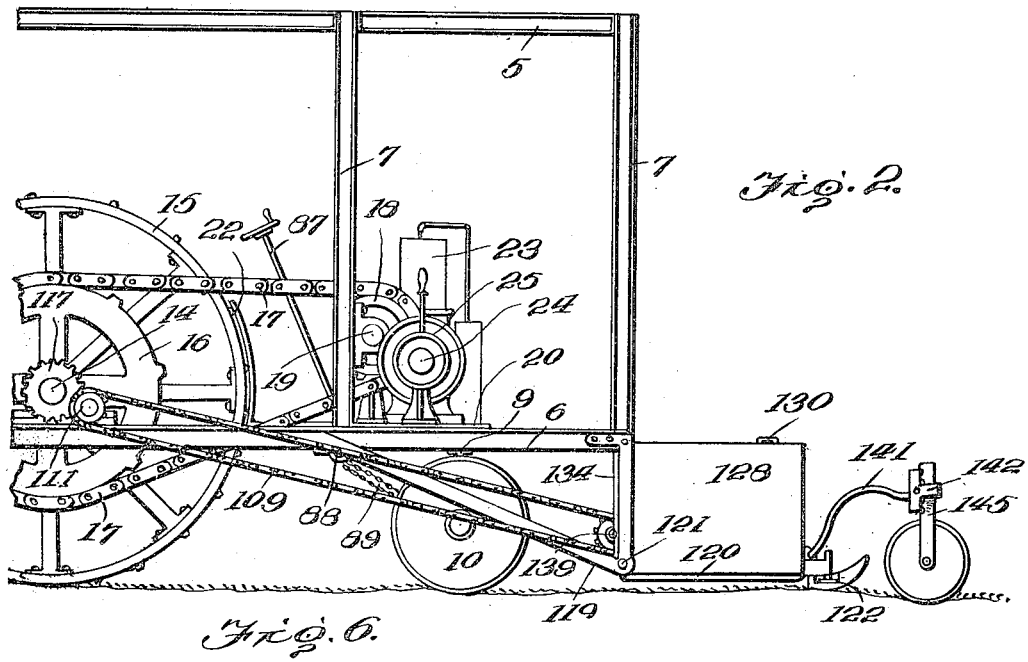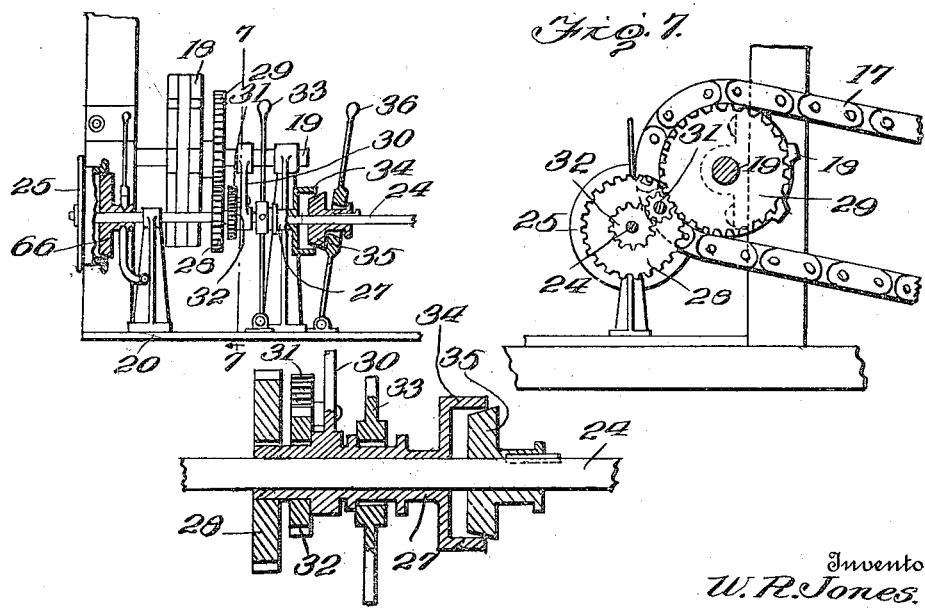

UNITED STATES PATENT OFFICE.

WILLIAM R. JONES, OF MARION, MICHIGAN.

MOWER AND TEDDER.

1,137,630.

Specification of Letters Patent.   Patented Apr. 27, 1915.

Original application filed March 29, 1912, Serial No. 687,192. Divided and this application filed April 18, 1913. Serial No. 762,160.

*To all whom it may concern:*

Be it known that I, WILLIAM R. JONES, citizen of the United States, residing at Marion, in the county of Osceola and State of Michigan, have invented certain new and useful Improvements in Mowers and Tedders, of which the following is a specification.

This invention relates to harvesters, and has special reference to mowers and tedders, the present application being a division of an application filed by me March 29, 1912, Serial No. 687,192.

The object of this invention is to provide a motor-driven machine in which the harvesting mechanism may be driven from the traction wheels of the truck and in which certain parts may be readily dismantled thereby adapting the machine for general use as a traction engine.

The invention is fully illustrated in the accompanying drawings and the novel features will be pointed out in the claims.

In the drawings: Figure 1 is a perspective view of a machine embodying the present invention, the rear end of the frame or truck being omitted; Fig. 2 is a side elevation of the same; Fig. 3 is an enlarged vertical section of a caster wheel employed on the mower; Fig. 4 is a detail perspective view of the mechanism by which the gear of the mower is thrown into and out of mesh with the traction wheel; Fig. 5 is a detail vertical section of the same; Fig. 6 is a sectional elevation of the gearing connecting the motor with the traction wheels; Fig. 7 is a section on the line 7—7 of Fig. 6; Fig. 8 is a longitudinal section of a portion of the driving shaft and parts associated therewith.

The truck comprises upper and lower side bars 5 and 6, preferably formed of angle iron, connected by spaced uprights 7 to which are bolted or otherwise rigidly secured spaced transverse bars 8. The supporting frame or truck is provided near its front end with a transverse head block or yoke 9 on which are pivotally mounted the steering wheels 10.

Journaled in suitable bearings on the lower side bars of the truck, is a rear axle 14 on which are mounted for rotation spaced traction wheels 15. Each traction wheel 15 is provided with a sprocket wheel 16 over which extends a sprocket chain 17 leading to a relatively small sprocket wheel 18 mounted on a stub shaft 19. Resting on the lower side bars of the truck, is a platform 20 which may have a seat secured thereto and is provided with an upwardly and rearwardly extending plate 22 which forms a guard for the traction wheels 15.

Mounted on the platform 20, is an engine or other suitable motor 23, the driving shaft 24 of which extends transversely of the truck and is provided with terminal pulleys 25 and 26. Slidably mounted on each end of the driving shaft 24, is a sleeve 27 having a gear wheel 28 secured thereto which meshes with a similar gear wheel 29 secured to the adjacent stub shaft 19 so that when the driving shaft 24 is rotated, motion will be transmitted through the gearing to the traction wheels to drive the machine in a forward direction. Each sleeve 27 is provided with a connecting bar 30 which encircles the adjacent stub shaft 19 and on which is mounted a pinion 31, which latter meshes with a pinion 32 carried by the sleeve so that by operating the shipper lever 33, the gear wheel 28 may be moved out of engagement with the wheel 29 and the pinion 31 moved into mesh therewith so as to cause the machine to travel in a rearward direction, when desired. One end of each sleeve 27 terminates in a clutch member 34 for engagement with a corresponding clutch member 35, the latter being secured to and movable with a lever 36, by operating which, motion may be transmitted from the engine to the traction wheels or the shaft 24 allowed to rotate without affecting the machine. Thus it will be seen that by manipulating the levers 33 and 36, the machine may be caused to travel either in a forward or rearward direction or the engine allowed to run without affecting the truck.

The front axle and steering wheels are attached to the lower side bars of the truck under the front edge of the platform 20 and a steering post 87 is provided on the platform, said post being geared to a shaft 88 mounted on the frame below the platform and connected with the axle of the steering wheels 10 by chains 89.

Triangular brackets 119 are secured to the lower side bars of the truck frame to form a support for the mower which comprises a substantially rectangular frame 120 having its inner end pivotally mounted at 121 on the brackets 119 and its outer or forward end provided with a reciprocating cutter bar of any suitable construction, indicated at 122. Arranged at the rear of the cutter bar 122 and mounted for rotation on suitable rollers 123 carried by the frame 120, is a belt or conveyer 124 which serves to receive the grain and deliver the latter to a suitable tedder 125.

Arranged at the rear of the conveyer 124, is an upright guard plate 126 which acts as a barrier to prevent the grain from being thrown back of the conveyer during the cutting operation, there being a similar plate 127 arranged beneath the conveyer and a vertically disposed guard plate 128 at the end of the conveyer opposite the tedder, as shown. A roller 129 is also preferably interposed between the cutter bar and conveyer to assist in delivering the grain to said conveyer.

The tedder 125, which may be of any approved construction, consists of a crank shaft 130 to which are connected a series of rods 131 leading to the usual kicking devices or forks. One end of the shaft 130 is journaled in an upright support 132, while the other end thereof extends through the rear plate 126 and is provided with a sprocket wheel 133 for engagement with a sprocket chain 134, which latter is arranged at the rear of the plate 126 and is operatively connected with a similar sprocket wheel 135 mounted on a shaft 136. The shaft 136 serves to operate the intermediate roller 137 and the roller 129 and also actuates the cutter bar.

Motion is transmitted from the rear wheels of the truck to the cutter bar and tedder through the medium of a sprocket chain 109 which extends over the sprocket wheel 111 and also over a similar sprocket wheel secured to one end of a transverse shaft 139. This transverse shaft 139 is provided with a beveled gear 140 which meshes with a similar beveled gear secured to the shaft 136 so that as the machine is driven in a forward direction over a field, the cutter will be actuated and the tedder simultaneously operated, as will be readily understood.

Secured to the frame 120, is a forwardly projecting arm 141 terminating in a casing 142 in which is mounted for rotation a pinion 143, the latter being actuated by a handle or crank 144 to engage the teeth of a caster wheel 145 so as to adjust the caster wheel vertically, and thus raise or lower the cutter bar. Other harvesting machinery may be attached to the tractor in the same manner as the mowing machine is attached thereto.

The sprocket wheel 111 is mounted on a stub shaft 112 which is journaled in a suitable bracket 113 which bracket is in turn pivotally mounted at 114 on a corresponding bracket 115 secured to one of the side bars of the truck frame, as best shown in Figs. 4 and 5 of the drawings. The stub shaft 112 is provided with a pinion 116 which meshes with a master gear 117 secured to one of the traction wheels 15. A rod 118 is pivotally connected at one corner of the plate or bracket 113 and is extended to a point within convenient reach of the operator's seat so that by exerting a pull in one direction on the rod 118, the pinion 116 may be thrown into engagement with the master gear 117 so as to actuate the mowing mechanism, and by exerting a pull in the opposite direction on said rod, the pinion may be disengaged from the master gear 117 so as to permit the machine to travel without affecting the mowing mechanism.

If the mower and tedder with the bracket supporting the same be removed, the machine may be used advantageously as a traction engine for general farm use. When so used the pully 26 may be connected through the medium of a belt with a threshing machine, separator or other machinery for driving the same.

What I claim is:—

1. An agricultural machine including a wheeled truck, an auxiliary frame pivotally mounted beneath the front end of the truck and extending in advance of the same, the width of the truck and of the auxiliary frame being the same, a vertical imperforate guard plate arranged at the rear side of the auxiliary frame and coextensive therewith and extending upwardly therefrom to the front end of the truck, a second vertical guard plate projecting longitudinally from the truck at one end of the auxiliary frame, a cutter on the front of the auxiliary frame adjacent said second guard plate, a conveyer carried by the auxiliary frame and coöperating with the cutter and moving transversely of the truck from the longitudinally extending guard plate, a tedder operating longitudinally of and above the conveyer at the end of the auxiliary frame remote from said guard plate, a driving shaft on the truck, and means for transmitting motion from the driving shaft to the tedder, conveyer and cutter.

2. An agricultural machine comprising a truck, brackets secured to and depending from the front end of the truck at the sides thereof, a horizontal rectangular frame secured to the lower front ends of said brackets and extending between the same and projecting in advance of the truck, a cutter on the front side of the said frame at one end thereof, a conveyer mounted on said frame and operable transversely of the truck, a vertical guard plate rising from the auxiliary frame to the front of the truck and equal in length to the rear side of the auxiliary frame, a second vertical guard plate projecting forward from one end of the first mentioned guard plate to the front side of the auxiliary frame, an upright on the front side of the auxiliary frame extending parallel with the first mentioned guard plate from the cutter to the end of the auxiliary frame, a tedder mounted above the conveyer between the first mentioned guard plate and said upright and operating longitudinally of the conveyer, and means for actuating the cutter, the conveyer and the tedder supported by the bottom of the rectangular frame and in rear of the first mentioned guard plate and operated from the truck.

3. An agricultural machine comprising a truck, brackets secured rigidly to and depending from the sides of the truck at the front end of the same, an auxiliary frame carried by the lower ends of said brackets and extending between and projecting forwardly from the same, a vertical guard plate erected on one end of the said frame, a second vertical guard plate at the rear of the auxiliary frame and closing the entire space between the auxiliary frame and the truck and the brackets depending from the truck, and a third vertical guard plate on the front of the auxiliary frame adjacent the end thereof remote from the first mentioned guard plate.

4. An agricultural machine comprising a truck, brackets secured rigidly to and depending from the sides of the truck at the front end of the same, an auxiliary frame pivoted at its rear side to the lower ends of said brackets and extending between the same, a traveling support for the front side of the auxiliary frame, a vertical guard plate erected on one end of said frame, a second vertical guard plate at the rear side of the frame and closing the entire space between the frame and the truck, and a third vertical plate on the front of the frame adjacent the end thereof remote from the first-mentioned guard plate.

In testimony whereof I affix my signature in presence of two witnesses.

WILLIAM R. JONES. [L. S.]

Witnesses:
F. D. ELLIOTT,
R. A. LEWIS.

Copies of this patent may be obtained for five cents each, by addressing the "Commissioner of Patents, Washington, D. C."